US012578844B2

(12) United States Patent
Li et al.

(10) Patent No.: US 12,578,844 B2
(45) Date of Patent: Mar. 17, 2026

(54) DATA PROCESSING METHOD FOR INTERACTION MODE SWITCHING, ELECTRONIC DEVICE

(71) Applicant: Lenovo (Beijing) Limited, Beijing (CN)

(72) Inventors: Nianlong Li, Beijing (CN); Liuxin Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 155 days.

(21) Appl. No.: 18/465,684

(22) Filed: Sep. 12, 2023

(65) Prior Publication Data

US 2024/0111398 A1 Apr. 4, 2024

(30) Foreign Application Priority Data

Sep. 29, 2022 (CN) .......................... 202211201133.6

(51) Int. Cl.
| | |
|---|---|
| *G06F 3/0484* | (2022.01) |
| *G06F 3/01* | (2006.01) |
| *G06F 3/04812* | (2022.01) |
| *G06F 3/04842* | (2022.01) |
| *G06T 19/00* | (2011.01) |

(52) U.S. Cl.
CPC ............ *G06F 3/0484* (2013.01); *G06F 3/011* (2013.01); *G06F 3/013* (2013.01); *G06F 3/017* (2013.01); *G06F 3/04812* (2013.01); *G06F 3/04842* (2013.01); *G06T 19/00* (2013.01)

(58) Field of Classification Search
CPC ...... G06F 3/013; G06F 3/04815; G06F 3/033; G06F 3/04842; G06F 3/0484; G06F 3/011; G06F 3/017; G06F 3/04812; G06T 19/00; G06T 19/003; G06T 19/006; G06T 19/20
See application file for complete search history.

(56) References Cited

U.S. PATENT DOCUMENTS

| | | | | |
|---|---|---|---|---|
| 7,190,378 B2 * | 3/2007 | Sauer | ...................... | G06F 3/011 |
| | | | | 715/773 |
| 2012/0300061 A1 * | 11/2012 | Osman | .................. | G06F 1/3231 |
| | | | | 340/436 |
| 2014/0354539 A1 * | 12/2014 | Skogo | ..................... | G06F 3/013 |
| | | | | 345/156 |
| 2020/0012341 A1 * | 1/2020 | Stellmach | ............... | G06F 3/017 |
| 2021/0366440 A1 * | 11/2021 | Burns | ...................... | G06F 3/013 |
| 2022/0317776 A1 * | 10/2022 | Sundstrom | .............. | G06F 3/017 |
| 2023/0100689 A1 * | 3/2023 | Chiu | ........................ | G06F 3/013 |
| | | | | 345/157 |
| 2023/0244321 A1 * | 8/2023 | Schoen | ............... | G06F 3/04847 |
| | | | | 345/157 |
| 2024/0212268 A1 * | 6/2024 | Meno | ...................... | G06T 17/00 |

* cited by examiner

*Primary Examiner* — Nicholas Ulrich
(74) *Attorney, Agent, or Firm* — ANOVA LAW GROUP, PLLC

(57) ABSTRACT

A data processing method is disclosed. The method includes obtaining target operation information, determining a first area from a first interface in response to the target operation information satisfying a first condition, and switching the first area from a first interaction mode to a second interaction mode.

15 Claims, 5 Drawing Sheets

Electronic Device
100

DATA PROCESSING METHOD FOR INTERACTION MODE SWITCHING, ELECTRONIC DEVICE

CROSS-REFERENCES TO RELATED APPLICATION

This application claims priority to Chinese Patent Application No. 202211201133.6 filed on Sep. 29, 2022, the entire content of which is incorporated herein by reference.

FIELD OF TECHNOLOGY

The present disclosure relates to the field of computer control and, more specifically, to a data processing method and device, an electronic device, and a computer-readable storage medium.

BACKGROUND

In many applications, the interaction method for an interface is generally to maintain a fixed interaction mode, and the user can only interact with the interface in the fixed interaction mode. In many use cases, a single interaction mode cannot be compatible with different interaction requirements. For example, there is often a conflict between the completeness of the display screen and the precision of the screen operation. The current interaction methods can only make tradeoffs between the two, but cannot resolve this conflict.

SUMMARY

One aspect of the present disclosure provides a data processing method. The data process method includes obtaining target operation information, determining a first area from a first interface in response to the target operation information satisfying a first condition, and switching the first area from a first interaction mode to a second interaction mode.

Another aspect of the present disclosure provides a data processing device. The data process device includes an acquisition module, a determining module, and a switching module. The acquisition module is configured to obtain target operation information. The determining module is configured to determine a first area from a first interface when the target operation information satisfies a first condition. The switching module is configured to switch the first area from a first interaction mode to a second interaction mode.

Another aspect of the present disclosure provides an electronic device. The electronic device includes a processor and a memory storing a computer program that, when executed, causes the processor to obtain target operation information, determine a first area from a first interface in response to the target operation information satisfying a first condition, and switch the first area from a first interaction mode to a second interaction mode.

DETAILED DESCRIPTION

Figure 1:
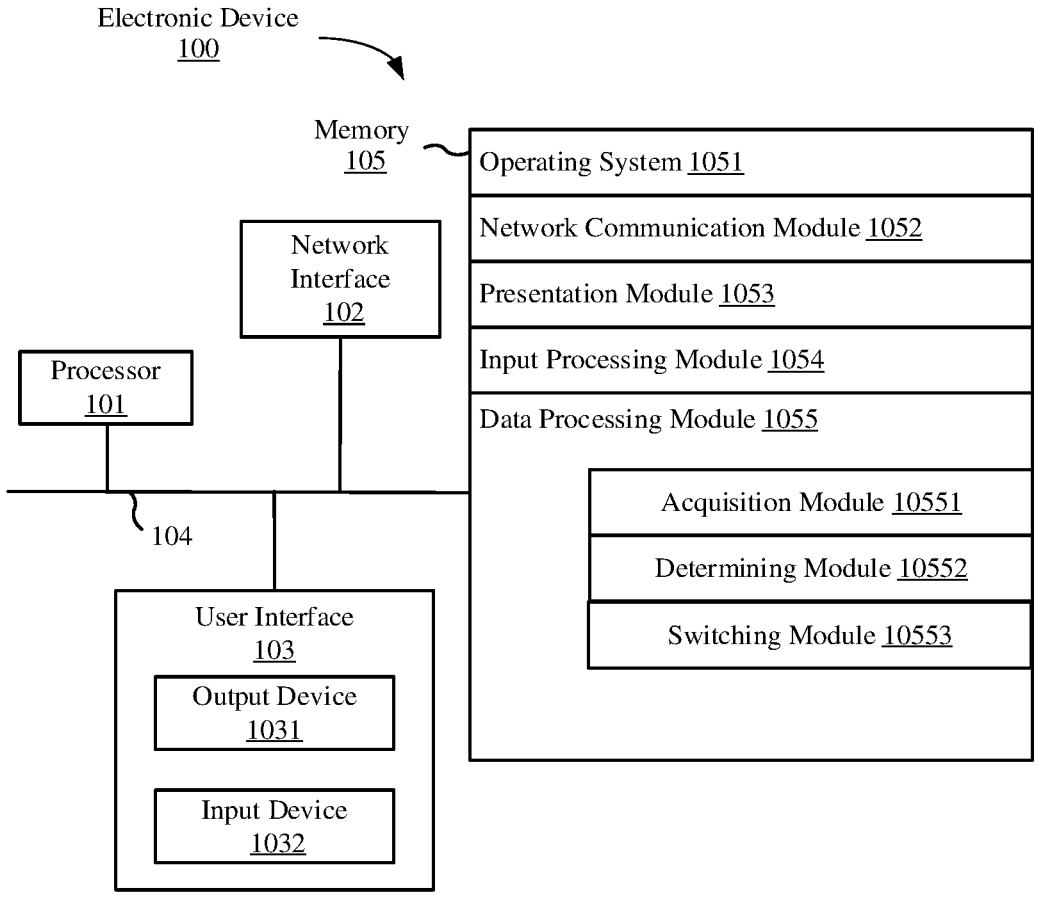
FIG. 1 is a schematic structural diagram of an electronic device according to an embodiment of the present disclosure.

Reference will now be made in detail to exemplary embodiments of the disclosure, which are illustrated in the accompanying drawings. Hereinafter, embodiments consistent with the disclosure will be described with reference to drawings. Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

In the present disclosure, description with reference to the terms "one embodiment," "some embodiments," "example," "specific example," or "some examples," etc., means that specific features described in connection with the embodiment or example, structure, material or feature is included in at least one embodiment or example of the present disclosure. Furthermore, the particular features, structures, materials or characteristics described may be combined in any suitable manner in any one or more embodiments or examples. Furthermore, those skilled in the art may combine the different embodiments or examples described in this specification, as well as the features of the different embodiments or examples, as long as they do not conflict with each other.

In the present disclosure, the terms "first," "second," and "third" are only used for descriptive purposes, and should not be understood as indicating or implying relative importance or implying the number of indicated technical features. Thus, a feature described with "first," "second," and "third" may expressly or implicitly include at least one of these features, and the order may be changed according to the actual situations.

Unless otherwise defined, all technical and scientific terms used herein have the same meaning as commonly understood by those skilled in the technical field to which the present disclosure belongs. The terms used herein are only for the purpose of describing the embodiments of the present disclosure, and are not intended to limit the scope of the present disclosure.

Using virtual reality (VR), augmented reality (AR), or glasses-free three-dimensional (3D) technology to expand the traditional two-dimensional (2D) display to 3D display to enhance the working environment has become a new trend. The 3D display method can intuitively represent the scene and enhance the user's sense of immersion, but it also faces the challenge of input accuracy in interaction. In the 3D working environment, for common tasks such as object modeling and data analysis, there are high requirements for operational accuracy, such as splicing and registering parts, stretching and zooming, or data selection and viewing in charts. However, the input accuracy of conventional spatial interaction methods is very limited when dealing with such tasks. In addition, due to the lack of support of a physical plane, a user is prone to fatigue after prolonged use.

Based on this, embodiments of the present disclosure provide a data processing method and device, an electronic device, and a computer-readable storage medium to improve compatibility between different interaction requirements.

An electronic device used to implement the data processing method provided in the embodiment of the present disclosure will be described first. FIG. 1 is a schematic structural diagram of an electronic device 100 according to an embodiment of the present disclosure. In some embodiments, the electronic device 100 may be implemented as a terminal or a server. The terminal may be a laptop, a tablet computer, a desktop computer, a smart phone, a dedicated messaging device, a portable gaming device, a smart speaker, a smart watch, a smart display device, etc., but is not limited thereto. The server may be an independent physical server, a server cluster or a distributed system composed of multiple physical servers, or a cloud server providing basic cloud computing services such as cloud services, cloud databases, cloud computing, cloud functions, cloud storage, network services, cloud communication, middleware services, domain name services, security services, and content delivery network (CDN) services, and big data and artificial intelligence platforms. The electronic device 100 shown in FIG. 1 includes at least one processor 101, a memory 105, at least one network interface 102, and a user interface 103. Various components in the electronic device 100 are coupled together through a bus system 104. It can be understood that the bus system 104 can be used to realize connection and communication between these components. In addition to the data bus, the bus system 104 may also include a power bus, a control bus, and a status signal bus. For clarity and brevity of the present disclosure, the various buses are labeled as bus system 104 in FIG. 1.

The processor 101 may be an integrated circuit chip with signal processing capabilities, such as a general-purpose processor, a digital signal processor (DSP), or other programmable logic devices, discrete gate or transistor logic devices, discrete hardware components, etc. In some embodiments, the general-purpose processor may be a microprocessor or any conventional processor.

The user interface 103 may include one or more output devices 1031 that enable presentation of media content, including one or more speakers and/or one or more visual displays. The user interface 103 may also include one or more input devices 1032, including user interface components that facilitates user input, such as a keyboard, a mouse, a microphone, a touch screen display, a camera, or other input buttons and controls.

The memory 105 may be removable, non-removable, or a combination thereof. Exemplary hardware devices include solid state memories, hard drives, optical drives, etc. In some embodiments, the memory 105 may optionally include one or more storage devices physically located remote from the processor 101.

The memory 105 may include a volatile memory or a non-volatile memory, and may also include both the volatile memory and the non-volatile memory. The non-volatile memory may be a read-only memory (ROM), and the volatile memory may be a random-access memory (RAM). The memory 105 described in the embodiments of the present disclosure is intended to include any suitable type of memory.

In some embodiments, the memory 105 may be used to store data to support various operations. Examples of such data include programs, modules, and data structures, or subsets or supersets thereof. In the embodiments of the present disclosure, an operating system 1051, a network communication module 1052, a presentation module 1053, an input processing module 1054, and a data processing device 1055 are included in the memory 105.

In some embodiments, the operating system 1051 may include system programs for handling various basic system services and performing hardware-related tasks, such as framework layer, core library layer, driver layer etc., to implement various basics services and handle hardware-based tasks.

In some embodiments, the network communication module 1052 may be configured to reach other computing devices via one or more (wired or wireless) network interfaces 102. In some embodiments, the network interface 102 may include Bluetooth, wireless fidelity (Wi-Fi), universal serial bus (USB), etc.

In some embodiments, the presentation module 1053 may be configured to present information (e.g., a user interface for operating peripheral devices and displaying content and information) via one or more output devices 1031 (e.g., display screens, speakers, etc.) associated with the user interface 103.

In some embodiments, the input processing module 1054 may be configured to detect one or more user inputs or interactions from one or more input devices 1032 and translate the detects inputs or interactions.

In some embodiments, the data processing device provided in the embodiments of the present disclosure may be realized by software. In FIG. 1, the data processing device 1055 is stored in the memory 105, and the data processing device 1055 may be software in the form of programs and plug-ins, including an acquisition module 10551, a determining module 10552, and a switching module 10553. There modules are logics, therefore, these modules can be combined or further divided arbitrarily according to the functions to be realized. The function of each module will be described in detail below.

In other embodiments, the data processing device provided in the embodiments of the present disclosure may be realized by hardware. For example, the data processing device provided in the embodiments of the present disclosure may be a processor in the form of a hardware decoding processor, which is programmed to execute the data processing method provided in the embodiments of the present disclosure. In some embodiments, a processor in the form of a hardware decoding processor may be one or more application specific integrated circuits (ASICs), DSPs, programmable logic devices (PLDs), complex programmable logic devices (CPLDs), field-programmable gate arrays (FPGAs) or other electronic components.

The data processing method provided in the embodiments of the present disclosure will be described below in conjunction with example applications and implementations of a terminal provided in the embodiments of the present disclosure.

Figure 2:
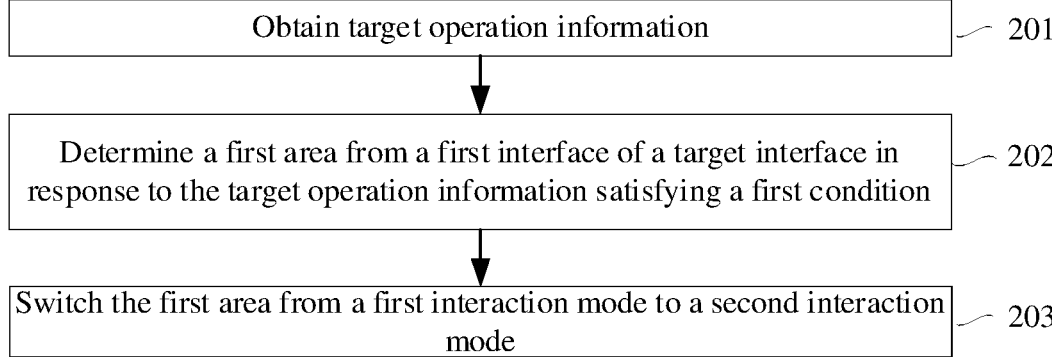
FIG. 2 is a flowchart of a data processing control method according to an embodiment of the present disclosure.

FIG. 2 is a flowchart of a data processing control method according to an embodiment of the present disclosure. The method will be described in detail below.

201, obtain target operation information.

202, determine a first area from a first interface in response to the target operation information satisfying a first condition.

203, switch the first area from a first interaction mode to a second interaction mode.

In some embodiments, the target operation information may be input by the end user through input devices. The input devices may include, but are not limited to keyboards, mice, touch screens, gesture sensing devices, eye-tracking devices, etc. After obtain the target operation information, the terminal may be configured to determine whether the target operation information satisfies the first condition. If the target operation information satisfies the first condition, the first area may be determined from the first interface, and the first area may be switched from the first interaction mode to the second interaction mode.

It should be understood that the interaction mode may be form presented by the interface for interacting with the user. Types of interaction modes may include, but are not limited to display interaction modes and operation interaction modes. In some embodiments, the display interaction modes may include image display modes, such as stereoscopic display or planar display. In some embodiments, the operation interaction modes may include an operation mode, and the operation mode may be a mouse operation, a keyboard operation, a gesture sensing operation, a touch screen operation, an eye-tracking operation, a voice operation, etc. In the embodiments of the present disclosure, the terminal may switch the interaction mode of the first area from the first interaction mode to the second interaction mode. In this way, the user can interact with the content in the first area through the second interaction mode.

In some embodiments, the target operation information may include first operation information and second operation information, and the operation modes corresponding to the first operation information and the second operation information may be different. In some cases, when the terminal obtains the first operation information and the second operation information, if the first operation information and the second operation satisfy the first condition, the first area may be determined from the first interface and the interaction mode of the first area may be switched.

More specifically, the terminal may be configured to determine whether the target operation information satisfies the first condition based on the relationship between the first operation information and the second operation information. In some embodiments, first operation information may include first position information, and the second operation information may include second position information. The first condition may at least include: the first position information and the second position information satisfying a first position relationship. In some embodiments, the first position information may be gazing point position information, and the second position information may be operation identification position information.

In some embodiments, the operation mode corresponding to the first operation information may be an eye-tracking operation. More specifically, the user may perform eye-tracking operations on the terminal through an eye-tracking device. The terminal may be configured to receive the eye movement signal of the eye movement tracking device to obtain the first operation information, and obtain the first position information of the gaze point in the first interface from the first operation information. The operation method of the second operation information may be a mouse operation, a keyboard operation, a gesture sensing operation, a touch screen operation, etc. The terminal may be configured to receive the second operation information, and obtain the second position information of the operation identifier from the second operation information. Subsequently, the terminal may determine whether the first position information and the second position information satisfy the first position relationship. In some embodiments, the first position relationship may be that the distance between the first position information and the second position information reaching a distance threshold. In the embodiments of the present disclosure, if the first position information and the second position information satisfy the first position relationship, the target operation information can be determined as satisfying the first condition.

In some embodiments, if the first position information and the second position information satisfy the first position relationship, the terminal may continue to determine whether the target operation information satisfies the first condition. More specifically, the first condition may include at least one of: the operation identifier corresponding to the operation identifier position information having a position change after the gazing point position information of the operation identifier position information satisfies the first position relationship; the gazing point position information and the operation identifier position information satisfying the first position relationship during the change process of the operation identifier position information; and, a duration during which the gazing point position information and the operation identifier position information satisfy the first position relationship being longer than a preset duration.

In some embodiments, if the operation identifier corresponding to the operation identifier position information has a position change after gazing point position information and the operation identifier position information satisfy the first position relationship, the target operation information may be determined as satisfying the first condition. In some embodiments, if the position information of the operation identifier satisfies the first position relationship during the change process, the target operation information may be determined as satisfying the first condition. In some embodiments, if the duration for which the gazing point position information and the operation identifier position information satisfy the first position relationship is longer than the preset duration, the target operation information may be determined as satisfying the first condition. In the embodiments of the present disclosure, on the basis that the gazing point position information and the operation identifier position information satisfy the first position relationship, additional conditions may be set to determine whether the target operation information satisfies the first condition to more accurately identify the user's operation intention.

In some embodiments, after it is determined that the target operation information satisfies the first condition, the first area may be determined from the first interface. More specifically, in some embodiments, when the target operation information includes the gazing point position information, and determining the first area from the first interface may include: determining at least one first display object from the first interface based on the gazing point position information; and, determining the first area based on the at least one first display object, all display areas of the at least one first display object in the first area being located in the first area.

In some embodiments, the terminal may be configured to determine a target range with the gazing point position information as the center point. In some embodiments, the distance between the boundary of the target range and the center point may be the interaction distance threshold. The terminal may be configured to determine at least one first display object based on the target range. In some embodiments, the object center of the first display object may be within the target range. Subsequently, the first area may be determined based on the at least one first display object. In some embodiments, all the display areas in the first display object may be located in the first area.

Figure 3A:
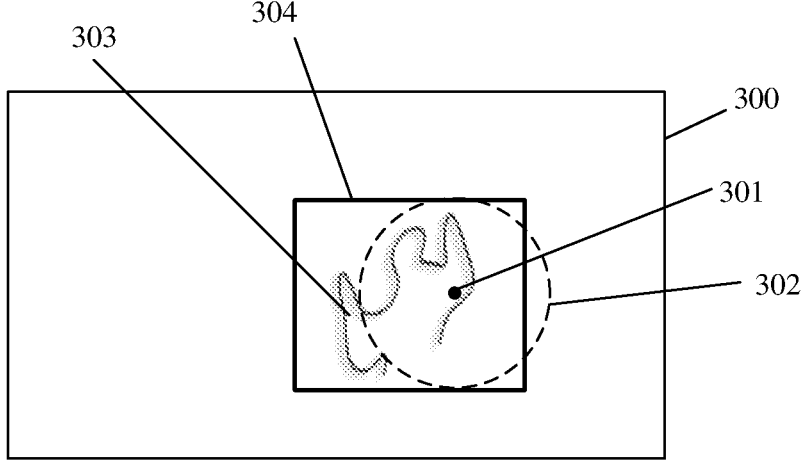
FIG. 3A is a schematic diagram of an optional interface of a first interface according to an embodiment of the present disclosure.

For example, refer to FIG. 3A, which is a schematic diagram of an optional interface of the first interface according to an embodiment of the present disclosure. In some embodiments, the terminal may determine a target range 302 centered on a gazing point 301 from a first interface 300 based on the gazing point information. Subsequently, at least one first display object 303 whose object center is within the target range 302 may be determined, and a first area 304 may be determined based on the display area corresponding to the first display object 303. In some embodiments, all the display areas corresponding to the first display object 303 may be located in the first area 304.

Figure 3B:
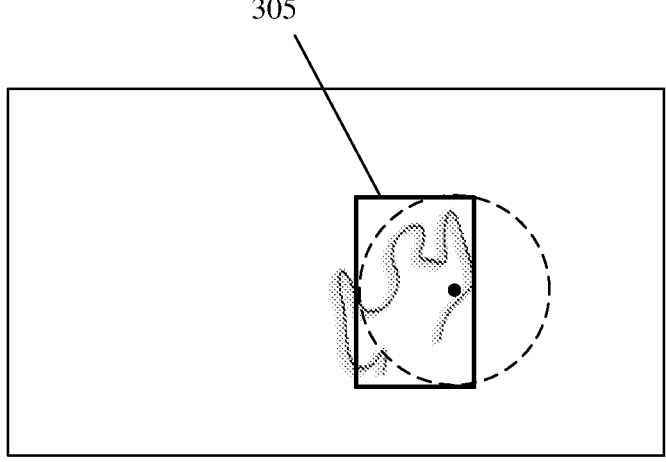
FIG. 3B is a schematic diagram of an optional interface of the first interface according to an embodiment of the present disclosure.

In some embodiments, the first area may also be determined based on an area where the display area of the first display object intersects the target range. For example, refer to FIG. 3B, which is a schematic diagram of an optional interface of the first interface according to an embodiment of the present disclosure. Here, the first area 305 includes the intersection area of the display area of the first display object 303 and the target range 302, but does not include the entire display area of the first display object 303.

In some embodiments, in the first interaction mode, the image of the first area may be perceived as a stereoscopic image by the viewer, and in the second interaction mode, the image of the first area may be perceived as a planar image by the viewer.

In some embodiments, the first interaction mode may be the default interaction mode when the target operation information does not satisfy the first condition. If the target operation information satisfies the first condition, the first area may be determined from the first interface, and the first area may be switched from the first interaction mode to the second interaction mode.

In some embodiments, the data processing method may be applied to a display device. The screen of the display device may include an optical structure. In the first interaction mode, the optical structure may enable the left and right eyes of the viewer to perceive different images, such that the image in the first area can be perceived by the viewer as a stereoscopic image. In the second interaction mode, the optical structure may enable the left and right eyes of the viewer to perceive the same image respectively, such that the image in the first area can be perceived by the viewer as a planar image.

In some embodiments, in the first interaction mode, the image in the first area may be perceived as a stereoscopic image by the viewer, and when switched to the second interaction mode, the image in the first area may be perceived as a planar image by the viewer. In some embodiments, in both the first interaction mode and the second interaction mode, the viewer may interact with the first area through eye-tracking operations and operations on the operation identifier. In some embodiments, the image of the first area may be switched from a stereoscopic image perceived by the viewer to a planar image, then the planar image may be adjusted to make the operation on the first area more precise.

In some embodiments, the first interface may be perceived by the viewer as a stereoscopic image interface, and an operation identifier may be displayed on the first interface. In the first interaction mode, the operation identifier may change position in any area in the first interface. In the second interaction mode, the position of the operation identifier may change in the first area of the first interface.

Figure 4A:
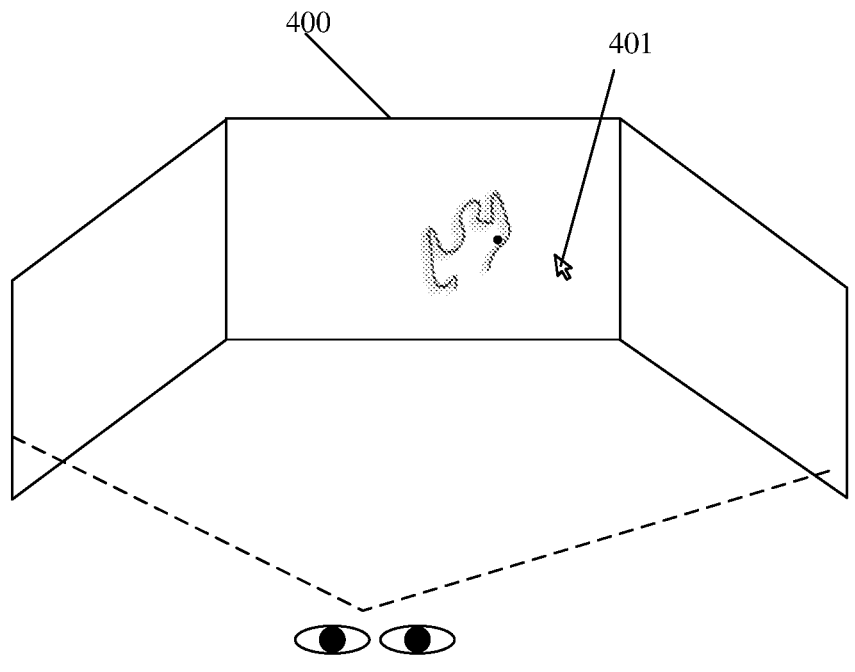
FIG. 4A is a schematic diagram of an optional interface in a first interaction mode according to an embodiment of the present disclosure.
Figure 4B:
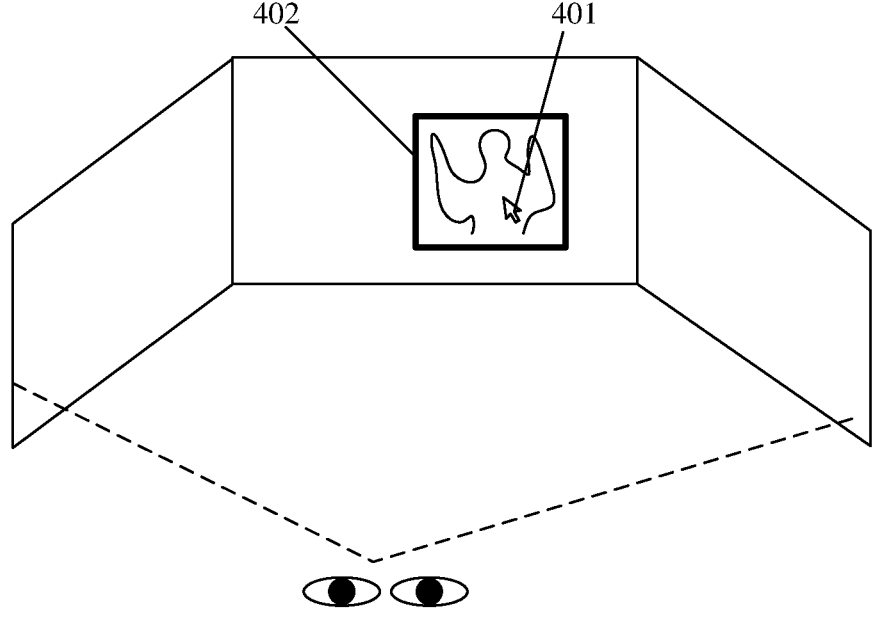
FIG. 4B is a schematic diagram of an optional interface in a second interaction mode according to an embodiment of the present disclosure.

For example, refer to FIG. 4A, which is schematic diagram of an optional interface in a first interaction mode according to an embodiment of the present disclosure. Here, a first interface 400 includes three sub-interfaces. In the first interaction mode, the position of an operation identifier 401 can be changed in any area of the first interface 400. Refer to FIG. 4B, which is a schematic diagram of an optional interface in a second interaction mode according to an embodiment of the present disclosure. In the second interaction mode, the operation identifier 401 can only change its position within a first area 402.

In some embodiments, in the first interaction mode, the image in the first area may be perceived as a stereoscopic image by the viewer, and in the second interaction mode, the image in the first area may be mapped to a second interface, and the mapped image may be perceived by the viewer in the second interface as a planar image.

In some embodiments, in the second interaction mode, the image of the first area may be mapped to the second interface, and the image mapped to the second interface may be recorded as a mapped image. The terminal may be configured to receive the operation information for the mapped image in the second interface, and synchronize the operation information to the first interface, thereby realizing the interaction between the user and the first area. It should be understood that the operation identifier displayed in the first interface will be mapped to the second interface synchronously with the image in the first area. The terminal may move the operation identifier within the second interface by receiving identifier operation information for the operation identifier.

In some embodiments, the data processing method may be applied to a display device. The display device may include an optical structure, and the optical structure may enable viewer to simultaneously perceive the first interface and the second interface.

Figure 5A:
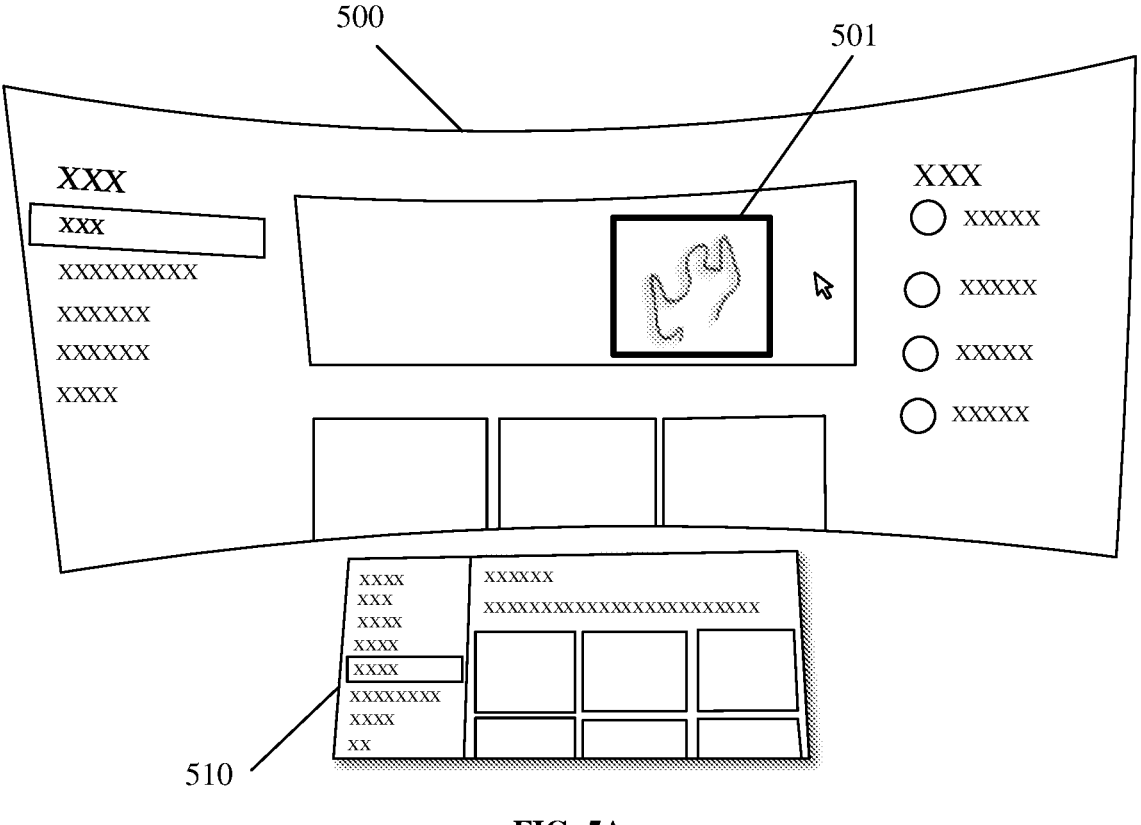
FIG. 5A is a schematic diagram of an optional interface in the first interaction mode according to an embodiment of the present disclosure.
Figure 5B:
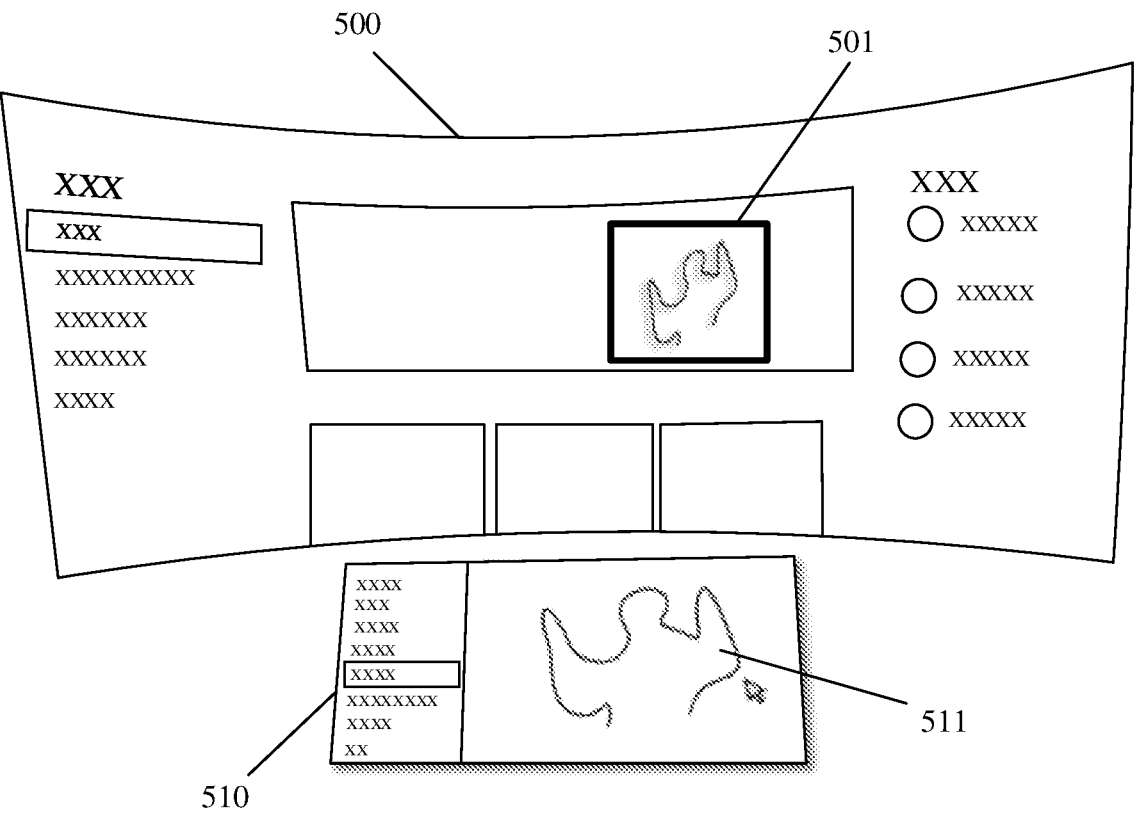
FIG. 5B is a schematic diagram of an optional interface in the second interaction mode according to an embodiment of the present disclosure.

For example, refer to FIG. 5A and FIG. 5B. FIG. 5A is a schematic diagram of an optional interface in the first interaction mode according to an embodiment of the present disclosure, and FIG. 5B is a schematic diagram of an optional interface in the second interaction mode according to an embodiment of the present disclosure. The display device provided by the embodiments of the present disclosure can enable the viewer to perceive the first interface and the second interface at the same time. A first interface 500 is perceived by the viewer as a stereoscopic image interface, and a second interface 510 is perceived by the viewer as a planar image interface. Here, the display device may be a head-mounted display, and the viewer may perceive at least two display interfaces through the head-mounted display. In the first interaction mode, the display device receives the target operation information. If the target operation information satisfies the first condition, a first area 501 is determined from the first interface 500, and the first area is switched from the first interaction mode to the second interaction mode. In the first interaction mode, the user may interact with the first area through the eye-tracking device and the operation identifier operation device. In the second interaction mode, the image of the first area is mapped to the second interface, and the mapped image is recorded as a mapped image 511. The mapped image 511 is perceived as a planar image by the viewer in the second interface. In the second interaction mode, the user may interact with the mapped image 511 through the eye-tracking device and the operation identifier operation device. The display device can receive the operation information for the mapped image 511, and synchronize the operation information to the first interface, thereby realizing the interaction between the user and the first area.

In some embodiments, the process at 203 may also be implemented as: obtaining a plurality of second display objects in the first area, and displaying the plurality of second display objects in a first display mode in the second interaction mode. The first display mode may prevent the plurality of display objects from blocking each other, or the first display mode may enable the plurality of display objects to operate independently of each other.

In some embodiments, if there are a plurality of second display objects in the first area, the plurality of second display objects may be displayed in a manner that do not block each other or may be operated independently of each other in the second interaction mode, such that the operation of the first area can be more precise.

In some embodiments, after the first area is switched from the first interaction mode to the second interaction mode, when the target operation information satisfies a second condition, the first area may be switched from the second interaction mode to the first interaction mode.

In some embodiments, the target operation information may include the gazing point position information and the operation identifier position information. More specifically, the second condition may be that the gazing point position information and the operation identifier position information do not satisfy the first position relationship. In practical applications, those skilled in the art may also set the second condition based on specific requirements in actual scenarios, which is not limited in the present disclosure.

Consistent with the present disclosure, when it is determined that the target operation information satisfies the first condition, the corresponding first area can be automatically determined from the first interface, and first area can be switched from the first interaction mode to the second interaction mode. In this way, different interaction modes can be used to be compatible with different interaction requirements, thereby improving the compatibility between different interaction requirements.

The following continues to illustrate an example structure of a data processing device 1055 implemented as a software module provided by the embodiments of the present disclosure. In some embodiments, as shown in FIG. 1, the software modules stored in the data processing module 1055 of memory 105 includes an acquisition module 10551, a determining module 10552, and a switching module 10553. A module or a unit may be implemented by software components, hardware components, or a combination thereof to realize the desired functionality.

In some embodiments, the acquisition module 10551 may be configured to obtain the target operation information.

In some embodiments, the determining module 10552 may be configured to determine the first area from the first interface when the target operation information satisfies the first condition.

In some embodiments, the switching module 10553 may be configured to switch the first area from the first interaction mode to the second interaction mode.

In some embodiments, the target operation information may include first operation information and second operation information, and the operation modes corresponding to the first operation information and the second operation information may be different.

In some embodiments, first operation information may include first position information, and the second operation information may include second position information. The first condition may at least include: the first position information and the second position information satisfying a first position relationship. In some embodiments, the first position information may be gazing point position information, and the second position information may be operation identification position information.

In some embodiments, the first condition may include at least one of: the operation identifier corresponding to the operation identifier position information having a position change after the gazing point position information of the operation identifier position information satisfies the first position relationship; the gazing point position information and the operation identifier position information satisfying the first position relationship during the change process of the operation identifier position information; and, a duration during which the gazing point position information and the operation identifier position information satisfy the first position relationship being longer than a preset duration.

In some embodiments, the target operation information may include the gazing point position information, and the determining module 10552 may be further configured to determine at least one first display object from the first interface based on the gazing point position information; and, determine the first area based on the at least one first display object, all display areas of the at least one first display object in the first interface being located in the first area.

In some embodiments, in the first interaction mode, the image of the first area may be perceived as a stereoscopic image by the viewer, and in the second interaction mode, the image of the first area may be perceived as a planar image by the viewer.

In some embodiments, the data processing method may be applied to a display device. The screen of the display device may include an optical structure. In the first interaction mode, the optical structure may enable the left and right eyes of the viewer to perceive different images, such that the image in the first area can be perceived by the viewer as a stereoscopic image. In the second interaction mode, the optical structure may enable the left and right eyes of the viewer to perceive the same image respectively, such that the image in the first area can be perceived by the viewer as a planar image.

In some embodiments, the first interface may be perceived by the viewer as a stereoscopic image interface, and an operation identifier may be displayed on the first interface. In the first interaction mode, the operation identifier may change position in any area in the first interface. In the second interaction mode, the position of the operation identifier may change in the first area of the first interface.

In some embodiments, in the first interaction mode, the image in the first area may be perceived as a stereoscopic image by the viewer, and in the second interaction mode, the image in the first area may be mapped to a second interface, and the mapped image may be perceived by the viewer in the second interface as a planar image.

In some embodiments, the data processing method may be applied to a display device. The display device may include an optical structure, and the optical structure may enable viewer to simultaneously perceive the first interface and the second interface.

In some embodiments, switching the first area from the first interaction mode to the second interaction mode may further includes obtaining a plurality of second display objects in the first area, and displaying the plurality of second display objects in a first display mode in the second interaction mode. The first display mode may prevent the plurality of display objects from blocking each other, or the first display mode may enable the plurality of display objects to operate independently of each other.

It should be noted that the description of the above device embodiment is similar to the description of the method embodiment above, which can achieve similar beneficial effects of the method embodiment, therefore repetitive description is omitted herein.

An embodiment of the present disclosure further provides a computer program product or a computer program. The computer program product or the computer program includes computer instructions. The computer instructions are stored in a computer readable storage medium. A processor of a computer device reads the computer instructions from the computer readable storage medium. The processor executes the computer instructions, such that the computer device executes the method for playing the live streaming video consistent with the disclosure.

An embodiment of the present disclosure further provides a computer-readable storage medium, storing executable instructions. The executable instructions are executed by a processor to implement the data processing method provided by the embodiments of the present disclosure.

In some embodiments, the computer readable storage medium may be an FRAM, ROM, PROM, EPROM, EEPROM, flash memory, a magnetic surface memory, an optical disk, a CD-ROM or other memories, or may be various devices including any one or any combination of the above memories.

In some embodiments, the executable instructions may be compiled in any form of programming language (including a compiled or an interpretive language, or a declarative or procedural language) by adopting a form of a program, software, a software module, a script or a code, and may be deployed in any form, including being deployed as an independent program or as a module, a component, a subroutine or other units suitable for being used in a computing environment.

As an example, the executable instructions may but not necessarily correspond to files in a file system, may be stored in a part of a file saving other programs or data, for example, stored in one or more scripts in a Hyper Text Markup Language (HTML) file, stored in a single file dedicated to a discussed program, or stored in a plurality of collaborative files (for example, a file storing one or more modules, a subprogram or a code part).

As an example, the executable instructions may be deployed to be executed on one computing device, or executed on a plurality of computing devices located in one place, or executed on a plurality of computing devices distributed in a plurality of places and interconnected through a communication network.

In view of the foregoing description, embodiments of the present disclosure can improve the compatibility between different interaction requirements.

The above are only some embodiments of the disclosure, and are not intended to limit the scope of the present disclosure. Any modification, equivalent replacement and improvement made within the spirit and scope of the disclosure fall within the scope of the present disclosure.

What is claimed is:

1. A data processing method comprising:

obtaining target operation information, the target operation information including operation identifier position information of an operation identifier that is displayed on a first interface;

determining a first area from the first interface in response to the target operation information satisfying a first condition;

switching the first area from a first interaction mode to a second interaction mode, wherein in the first interaction mode, an image of the first area is configured to be perceived as a stereoscopic image, and in the second interaction mode, the image of the first area is configured to be perceived as a planar image;

obtaining a plurality of display objects in the first area; and displaying the plurality of display objects in a first display mode in the second interaction mode, wherein the first display mode prevents the plurality of display objects from blocking each other, or enables the plurality of display objects to be operated independently of each other.

2. The data processing method of claim 1, wherein:

the target operation information includes first operation information and second operation information, and operation modes corresponding to the first operation information and the second operation information are different.

3. The data processing method of claim 2, wherein:

the first operation information includes first position information, and the second operation information includes second position information; and the first condition at least includes the first position information and the second position information satisfying a first position relationship, the first position information being gazing point information, and the second position information being the operation identifier position information.

4. The data processing method of claim 3, wherein the first condition further includes at least one of:

the operation identifier having a position change after the gazing point position information and the operation identifier position information satisfy the first position relationship;

the gazing point position information and the operation identifier position information satisfying the first position relationship in a process of changing the operation identifier position information; and a duration for which the gazing point position information and the operation identifier position information satisfying the first position relationship being longer than a preset duration.

5. The data processing method of claim 1, wherein:

the plurality of display objects are a plurality of first display objects; and the target operation information further includes gazing point position information, and determining the first area from the first interface includes:

determining at least one second display object from the first interface based on the gazing point position information; and determining the first area based on the at least one second display object, all display areas of the at least one second display object in the first interface being located in the first area.

6. The data processing method of claim 1, wherein:

the first interface is configured to be perceived as a stereoscopic image interface;

in the first interaction mode, the operation identifier changes position in any area in the first interface; and in the second interaction mode, the operation identifier changes position in the first area in the first interface.

7. The data processing method of claim 1, wherein:

in the second interaction mode, the image of the first area is mapped to a second interface, the mapped image being configured to be perceived as the planar image in the second interface.

8. An electronic device comprising:

a processor; and a memory storing a computer program that, when executed, causes the processor to:

obtain target operation information, the target operation information including operation identifier position information of an operation identifier that is displayed on a first interface;

determine a first area from the first interface in response to the target operation information satisfying a first condition;

switch the first area from a first interaction mode to a second interaction mode, wherein in the first interaction mode, an image of the first area is configured to be perceived as a stereoscopic image, and in the second interaction mode, the image of the first area is configured to be perceived as a planar image;

obtain a plurality of display objects in the first area; and display the plurality of display objects in a first display mode in the second interaction mode, wherein the first display mode prevents the plurality of display objects from blocking each other, or enables the plurality of display objects to be operated independently of each other.

9. The electronic device of claim 8, wherein:

the plurality of display objects are a plurality of first display objects; and the target operation information further includes gazing point position information, and the computer program, when executed, further causes the processor to:

determine at least one second display object from the first interface based on the gazing point position information; and determine the first area based on the at least one second display object, all display areas of the at least one second display object in the first interface being located in the first area.

10. The electronic device of claim 8, wherein:

the first interface is configured to be perceived as a stereoscopic image interface;

in the first interaction mode, the operation identifier changes position in any area in the first interface; and in the second interaction mode, the operation identifier changes position in the first area in the first interface.

11. The electronic device of claim 8, wherein:

in the second interaction mode, the image of the first area is mapped to a second interface, the mapped image being configured to be perceived as the planar image in the second interface.

12. The electronic device of claim 8, wherein:

the target operation information includes first operation information and second operation information, and operation modes corresponding to the first operation information and the second operation information are different.

13. The electronic device of claim 12, wherein:

the first operation information includes first position information, and the second operation information includes second position information; and the first condition at least includes the first position information and the second position information satisfying a first position relationship, the first position information being gazing point position information, and the second position information being the operation identifier position information.

14. The electronic device of claim 13, wherein the first condition further includes at least one of:

the operation identifier having a position change after the gazing point position information and the operation identifier position information satisfy the first position relationship;

the gazing point position information and the operation identifier position information satisfying the first position relationship in a process of changing the operation identifier position information; and a duration for which the gazing point position information and the operation identifier position information satisfying the first position relationship being longer than a preset duration.

15. A data processing method comprising:

obtaining target operation information;

determining a first area from a first interface in response to the target operation information satisfying a first condition, the first interface being configured to be perceived as a stereoscopic image interface, and an operation identifier being displayed on the first interface; and switching the first area from a first interaction mode to a second interaction mode, wherein:

in the first interaction mode, an image of the first area is configured to be perceived as a stereoscopic image, and the operation identifier changes position in any area in the first interface; and in the second interaction mode, the image of the first area is configured to be perceived as a planar image, and the operation identifier changes position in the first area in the first interface.

* * * * *